United States Patent

[11] 3,561,599

| [72] | Inventor | Brian Eric Sheen |
| | | Saint Austell, Cornwall, England |
| [21] | Appl. No. | 822,545 |
| [22] | Filed | May 7, 1969 |
| [45] | Patented | Feb. 9, 1971 |
| [73] | Assignee | English Clays Lovering Pochin & Company Limited |
| | | Saint Austell, Cornwall, England |
| | | a British Company |
| [32] | Priority | May 15, 1968 |
| [33] | | Great Britain |
| [31] | | 23183/68 |

[54] CHROMATOGRAPHY APPARATUS
7 Claims, 1 Drawing Fig.

| [52] | U.S. Cl. | 210/198 |
| [51] | Int. Cl. | B01d 15/08 |
| [50] | Field of Search | 210/31C, 198C |

[56] References Cited
UNITED STATES PATENTS

| 3,303,043 | 2/1967 | Halpaap et al. | 210/198X |
| 3,418,152 | 12/1968 | Staudenmayer et al. | 210/31X |
| 3,465,884 | 9/1969 | Matherne | 210/198X |

OTHER REFERENCES

Technique of Organic Chemistry Vol. X, Fundamentals of Chromatography, Interscience Publishers Inc., 1957, QD251W44C.4, pages 224— 227.

Primary Examiner—J. L. DeCesare
Attorney—Stevens, Davis, Miller & Mosher

ABSTRACT: A kaolinitic clay consisting of particles passing a No. 270 mesh A.S.T.M. Standard sieve and comprising at least 2 percent by weight of particles smaller than 2 microns equivalent spherical diameter is used as an adsorbent in thin layer chromatographic apparatus.

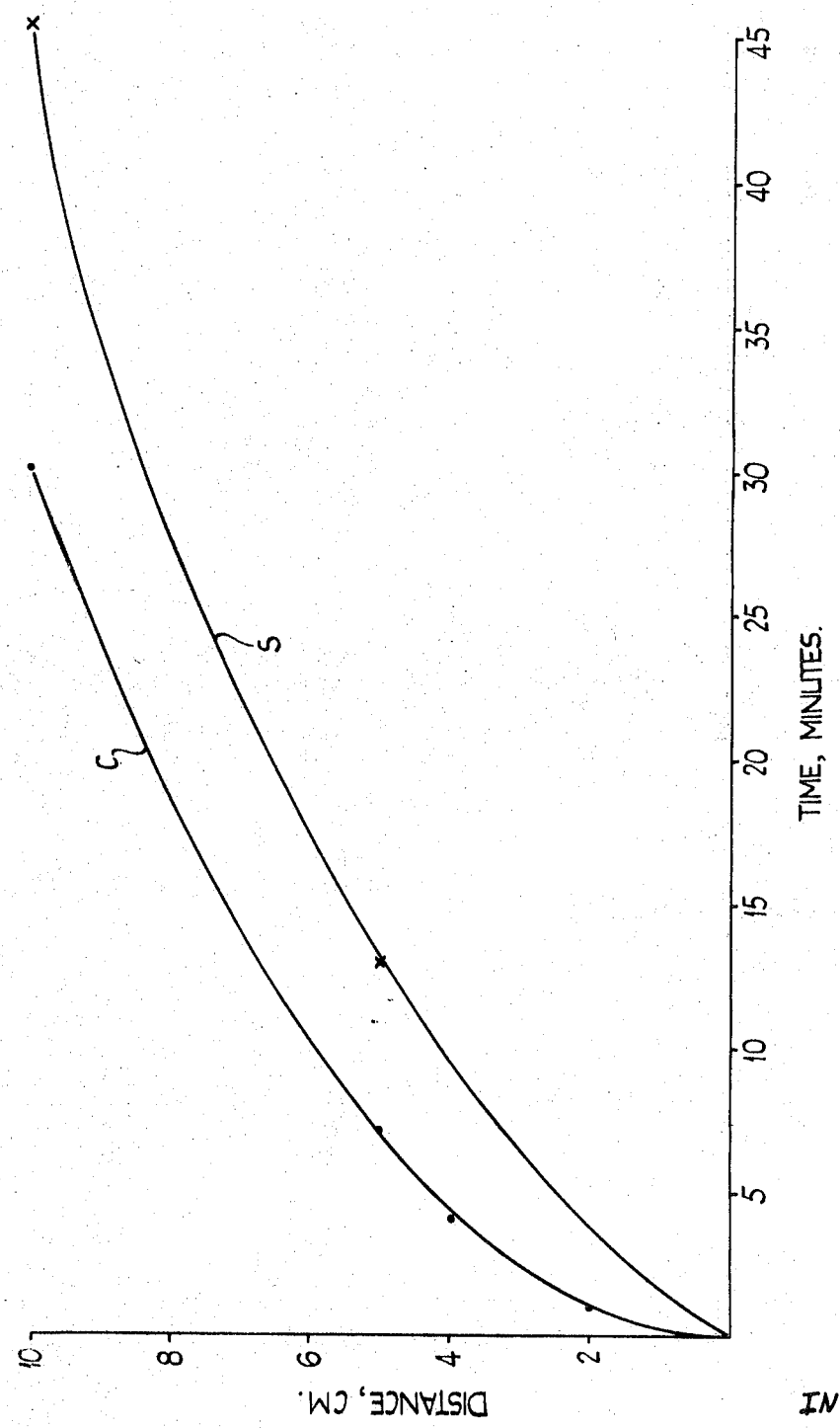

CHROMATOGRAPHY APPARATUS

BACKGROUND OF THE INVENTION

This invention relates to chromatography and is concerned with the use of kaolinitic clays as adsorbents in chromatography, more particularly in thin layer chromatography.

In thin layer chromatography, the general principles of which are now well known, a stationary phase is deposited on a solid support, which may be rigid or flexible and which can be, for example, a glass plate or a plastics material, in the form of a thin layer which is generally about 250 microns thick; the support and stationary phase are together often referred to as the chromatographic plate. At the present time, the stationary phase most frequently comprises silica gel adsorbent which is usually, but not necessarily, in admixture with a binder, e.g. plaster of Paris or starch, which gives more mechanical strength to the layer and improves the adhesion of the silica gel adsorbent to the support. Other materials which it has been suggested are suitable for use as the adsorbent include keiselguhr, alumina, and magnesium silicate.

SUMMARY OF THE INVENTION

According to the present invention there is provided a chromatographic apparatus which comprises a support and as an adsorbent a kaolinitic clay consisting of particles passing a No. 300 mesh British Standard (No. 270 mesh A.S.T.M. Standard) sieve and comprising at least 2 percent by weight of particles smaller than 2 microns equivalent spherical diameter.

By the term "kaolinitic clay" there is meant herein a clay comprising at least 50 percent by weight of kaolinite. Advantageously, the kaolinitic clay contains not more than 10 percent by weight of quartz and not more than 40 percent by weight of mica. The kaolinitic clay may also contain felspar and trace amounts of impurities such as tourmaline.

DESCRIPTION OF THE PREFERRED EMBODIMENTS

The kaolinitic clay, which advantageously comprises from 70 percent to 98 percent by weight of particles larger than 10 microns equivalent spherical diameter, can be, for example, a china clay.

The support can take the form of, a plate or sheet on which the kaolinitic clay is deposited as a thin layer of substantially uniform thickness, the resulting apparatus being used for thin layer chromatography.

The support can be a rigid or flexible base such as, for example, a glass plate or more preferably a flexible sheet of a plastics material , for example a polyester such as polyethylene terephthalate, a vinyl polymer such as polyvinyl chloride or polyvinyl acetate, a polyolefin such as polypropylene, or a polyamide. Advantageously, the support is clear and transparent. The kaolinitic clay adsorbent is advantageously admixed with a binder which is preferably plaster of Paris, i.e. calcium sulfate hemihydrate, although other binders, e.g. sodium silicate, polyvinyl alcohol, methylcellulose or starch, can be used. The amount of binder used is generally in the range 2 to 20 percent by weight, based on the total weight of kaolinitic clay and binder. In the case of plaster of Paris, the amount of binder used is preferably in the range of from 10 to 15 percent by weight based on the total weight of kaolinitic clay and binder, and, in the case of polyvinyl alcohol, the amount of binder used is preferably about 5 percent by weight, again based on the total weight of kaolinitic clay and binder.

A chromatographic plate for use in thin layer chromatography can be prepared by suspending in water a kaolinitic clay having the specified particle size distribution, together with a binder if required, coating the resulting suspension onto a suitable support surface, for example by means of a conventional applicator, and thereafter drying the suspension on the support surface. In preparing the suspension of the kaolinitic clay, and optionally the binder, in water, it has been found advantageous to use about one part by weight of kaolinitic clay, including binder if present, mixed with from about 1.5 to 2.5 parts by weight of water. It has also been found to be advantageous to add to the suspension from 0.1 percent to 5 by weight, based on the weight of kaolinitic clay and binder, of sodium carbonate since this reduces tailing or spreading of the chromatographic spots. The suspension of kaolinitic clay, and binder if present, is spread onto the surface of the support by means of, for example, a drawbar or a Bird applicator to form a layer of the appropriate thickness. Generally, it is found that the layer should have a thickness in the range of from 100 to 500 microns, and preferably in the range of from 150 to 400 microns. The layer is then dried, preferably at a temperature in the range of from 60° to 95° C., to form the chromatographic plate.

The invention will now be illustrated by the following examples in which there are described the preparation of thin layer chromatographic apparatus in accordance with the invention and the use thereof in thin layer chromatography.

The accompanying drawing is a graph showing the result obtained with a thin film embodying the invention in comparison with that obtained under like conditions with a thin film of silica gel.

EXAMPLE 1

An English china clay, having a particle size distribution such that 50 percent by weight consisted of particles larger than 10 microns equivalent spherical diameter and 20 percent by weight of particles smaller than 2 microns equivalent spherical diameter, was dried by conventional means to give a lump product having a water content in the range from 8 percent to 12 percent by weight. This material was slurried with water to form a suspension containing not more than 30 percent by weight of solids, the pH of the suspension was adjusted with sodium carbonate solution to 7, the minimum quantity of sodium silicate deflocculating agent required to deflocculate the china clay completely was added, and finally the pH of the suspension was adjusted to 8.5 with alkali. The deflocculated suspension was then allowed to sediment under gravity for 1 hour per foot depth of suspension and, at the end of this time, the material remaining in suspension was rejected. The sedimented material was then reslurried with water and the pH adjusted to percent with hydrochloric acid (sulfuric acid can be used instead of percent order to flocculate the clay. It was then screened twice through a No. 300 mesh British Standard sieve. The screened suspension was thickened by allowing the flocculated clay to settle, and pouring off the supernatant water. In order to remove the added chemicals the thickened clay was then washed by twice carrying out the steps of (a) reslurrying the clay with clean water, (b) allowing the clay to settle and (c) pouring off the supernatant water. The washed clay was filter-pressed and dried. The dried china clay was found to have a particle size analysis such that 100 percent by weight was smaller than No. 300 mesh British Standard sieve, 80 percent by weight was larger than 10 microns equivalent spherical diameter, 92 percent by weight was larger than 5 microns equivalent spherical diameter, and 96 percent by weight was larger than 2 microns equivalent spherical diameter. The mineralogical analysis by X-ray diffraction was as follows:

| Mineral | Percent by weight |
| --- | --- |
| Kaolinite | 65 |
| Mica | 26 |
| Quartz | 6 |
| Felspar | 3 |

87 parts by weight of the dried china clay were mixed with 13 parts by weight of plaster of Paris, as binder, and the mixture of china clay and binder was milled in a hammer mill to break down any agglomerates larger than a No. 300 mesh British Standard sieve. 25 g. of the china clay/binder mixture were then slurried with 40 ml. of water for one minute, and the suspension spread onto glass plates to a thickness of 400 microns using a conventional drawbar. The plates were allowed to stand in air until the surface of the layer had a matt appearance, and were then transferred to an oven at 80° C. to complete the drying.

For comparison, a second plate was prepared in a similar way, but with the china clay replaced by a conventional silicate gel prepared for thin layer chromatography and having a particle size distribution such that 69 percent by weight consisted of particles larger than 10 microns equivalent spherical diameter and 78 percent by weight of particles larger than 5 microns equivalent spherical diameter.

Near one end of each plate was placed a drop of B.D.H.L's "Universal Indicator" which had been concentrated by evaporation to one-third of the initial volume ("Universal Indicator" comprises five pH-sensitive indicator dyes dissolved in ethyl alcohol). The two plates were then supported vertically so that the end of the layer nearer to the spot of indicator was just submerged below the surface of ethyl alcohol in a sealed gas jar and the spot of indicator was above the surface. The solvent rose up each layer and carried the indicator dyes with it as it reached the spot. The time taken for the solvent to travel various distances above the surface was measured for each plate, and is shown graphically in the accompanying drawing wherein curve C shows the results obtained for the plate prepared using china clay as adsorbent and curve S shows the results obtained for a plate prepared using silica gel as adsorbent.

The degree of separation of the dyes was also examined after the solvent had risen 7.5 cm. above the spot on the china clay layer. The number of distinct coloured bands of the different dyes was taken as an indication of the degree of separation. The results are shown in table 1 below.

TABLE 1

|  | China clay | Silica gel |
|---|---|---|
| Number of distinct coloured bands | 5 | 3 |
| Length of plate covered by dyestuff, in cm | 7.5 | 4.5 |

In addition, it was noted that there was much more "tailing" and lateral spread in the silica gel layer than in the china clay layer.

EXAMPLE 2

Further plates were prepared in a similar way to that described in example 1, but using samples of china clays having different particle size distributions. Each plate was arranged so that one end of the layer was just submerged below the surface of ethyl alcohol in a sealed gas jar, and the time taken for the ethyl alcohol to rise 5 cm. up each layer was noted.

Table 2 below shows the relationship between speed of travel of the solvent through the layer, and the particle size analysis of the china clay.

TABLE 2

| Percent by weight of particles passing a No. 300 mesh B.S. sieve | Percent by weight of particles larger than 10 microns e.s.d. | Percent by weight of particles smaller than 2 microns e.s.d. | Time to rise 5 cm. (min.) |
|---|---|---|---|
| 100 | 90 | 2 | 7 |
| 100 | 80 | 4 | 7 |
| 100 | 45 | 15 | 15 |
| 100 | 25 | 20 | 30 |
| 100 | 10 | 50 | 165 |
| 100 | 0.2 | 80 | 225 |

EXAMPLE 3

Two chromatographic plates were prepared as described in example 1, one using china clay in accordance with this invention as the adsorbent and the other using silica gel. Near one end of each plate was placed a drop of B.D.H.Ltd's "Universal Indicator" which had been concentrated by evaporation of the solvent to one third of its original volume.

The two plates were then supported vertically so that the end of the layer nearer to the spot of indicator was just submerged below the surface of the solvent (ethyl acetate and ethyl alcohol in the ratio 3 : 1 by volume and containing 5 percent by volume of 0.880 ammonia solution based on the total volume of ethyl acetate and ethyl alcohol). The solvent rose up each layer and carried the indicator dyes with it as it reached the spot. The degree of separation of the dyes was examined after the solvent had risen 10 cm. above the spot on each layer. The number of distinct spots of colour was taken as an indication of the degree of separation. The results are shown in table 3 below in which the length over which the separation occurred is defined as the distance between the first and last spot at the completion of the test.

TABLE 3

|  | China clay | Silica |
|---|---|---|
| Number of spots separated | 5 | 5 |
| Length over which separation occurred, cm | 9 | 5 |

In addition, it was noted that the spots in the middle of the range were more widely separated on the china clay plate than on the silica plate.

EXAMPLE 4

This example illustrates the use of the invention for separating amino acids. The $R_F$ value for a substance on a given chromatographic layer is defined as the ratio of the distance travelled by the substance measured from the point of application of the mixture to the distance travelled by the solvent front. The $R_F$ value was determined for glycine in various solvent systems using chromatographic plates of china clay and silica prepared as described in example 1, and the results obtained are given in table 4 below.

TABLE 4

| Solvent system | $R_F$ China clay | $R_F$ Silica |
|---|---|---|
| Ethanol/water, 7:3 by vol | 0.75 | 0.43 |
| Butanol/acetic acid/water, 8:2:2 by vol | 0.30 | 0.22 |
| Ethanol/17% ammonia soln., 7:3 by vol | 0.89 | 0.34 |
| Chloroform/ethanol/17% ammonia soln., 2:2:1 by vol | 0.75 | 0.10 |

The $R_F$ values were also determined for various amino acids using butanol/acetic acid/water (8 : 2 : 2 by volume) as the solvent system and china clay and silica chromatographic plates identical to those used in example 1. The results are shown in table 5 below.

TABLE 5

| Amino Acid | $R_F$ China clay | $R_F$ Silica |
|---|---|---|
| L. Glutamic acid | 0.80 | 0.27 |
| L. Proline | 0.90 | 0.19 |
| DL. Threonine | 0.60 | 0.25 |
| L. Glutamine | 0.10 | |
| L. Aspartic acid | 0.90 | 0.21 |
| Glycine | 0.30 | 0.22 |
| L. Methionine | 0.75 | 0.40 |

EXAMPLE 5

A mixture of the four pharmaceutical compounds acetylsalicylic acid, caffeine, paracetanol and phenacetin was separated on a china clay layer prepared as in example 1 using as the solvent system ether and chloroform in the volume ratio 10 : 1. The compounds were separated as compact spots and the $R_F$ values were as follows:- phenacetin 0.95, paracetanol 0.70, caffeine 0.45, and acetylsalicylic acid 0.20. The separation could not be performed using the same solvent system on a silica gel layer.

The $R_F$ values were also determined for the four compounds in three different single solvents on china clay layers prepared as in example 1. The results are shown in table 6 below.

TABLE 6

| Solvent system | $R_F$ | | | |
|---|---|---|---|---|
| | Acetylsali-cylic acid | Phen-acetin | Caf-feine | Paracet-anol |
| Chloroform | 0.1 | 0.7 | 0.2 | 0.3 |
| Ether | 0.1 | 0.9 | 0.2 | 0.8 |
| Dichloromethane | 0.9 | 0.9 | 0.1 | 0.1 |

EXAMPLE 6

A china clay having a particle size distribution such that 50 percent by weight consisted of particles larger than 10 microns equivalent spherical diameter and 20 percent by weight of particles smaller than 2 microns equivalent spherical diameter, was dried by conventional means to give a lump product having a water content in the range from 8 percent to 12 percent by weight. This material was slurried with water to form a suspension containing 10 percent by weight of dry solids, the pH of the suspension was adjusted to 4.5 with hydrochloric acid, and the flocculated suspension thus formed was fed to a hydraulic cyclone having a maximum diameter of 3 inches (76 mm.) at a rate of 10 g.p.m. (7.57 × 10×$^3$ m.$^3$ sec.×1) and a pressure of 40 p.s.i. (2.76 × 10$^5$ Nm. $^{-2}$). The underflow was screened through a No. 300 mesh British Standard sieve and thickened, and then washed twice in the manner described in example 1. The washed clay was then filter pressed and dried in a conventional turbotray drier. The dried china clay was found to have a particle size analysis such that 100 percent by weight was smaller than No. 300 mesh British Standard sieve, 83 percent by weight was larger than 10 microns equivalent spherical diameter, 93 percent by weight was larger than 5 microns equivalent spherical diameter, and 96 percent by weight was larger than 2 microns equivalent spherical diameter. The mineralogical analysis by X-ray diffraction was as follows:

| Mineral | Percent by weight |
|---|---|
| Kaolinite | 61 |
| Mica | 29 |
| Quartz | 7 |
| Felspar | 3 |

87 parts by weight of the dried china clay were mixed with 13 parts by weight of plaster of Paris, as binder, and the mixture of china clay and binder was milled in a hammer mill through which was blown a current of hot air to break down any agglomerate larger than a No. 300 mesh British Standard sieve. 25 g. of the china clay/binder mixture were then slurried with 40 ml. of water for 1 minute, and the resulting suspension spread on to glass plates in layers of thickness 50, 100, 200, 400 and 600 microns, respectively. The plates were allowed to stand in air until the surface of the layers had a matt appearance, and were then transferred to an oven at 80° C. to complete the drying.

Near one end of each plate there was placed a drop of B.D.H.Ltd's "Universal Indicator" to act as a tracer for the solvent and the five plates were together supported vertically so that the end of the layer nearer to the spot of indicator was just submerged below the surface of ethyl alcohol in a sealed glass tank and the spot of indicator was above the surface. The rates of progession of the solvent front up each of the layers were compared by measuring the height of the layer wetted by the solvent after 40 minutes. The results obtained are given in table 7 below.

TABLE 7

| Thickness of layer (microns) | Height reached by solvent front after 40 minutes (cm.) |
|---|---|
| 50 | 8.2 |
| 100 | 9.0 |
| 200 | 9.8 |
| 400 | 9.6 |
| 600 | 9.4 |

These results show that there is no improvement in the rate of progression of solvent when the thickness is increased above 200 microns.

I claim:

1. A thin layer chromatographic apparatus which comprises a support plate and as an adsorbent layer on said plate a kaolinitic clay consisting of particles passing a No. 300 mesh British Standard sieve and comprising at least 2 percent and not more than 10 percent by weight of particles smaller than 2 microns equivalent spherical diameter and from 70 percent to 98 percent by weight of particles larger than 10 microns equivalent spherical diameter.

2. A thin layer chromatographic apparatus as claimed in claim 1, wherein said support plate is a rigid sheet and wherein the kaolinitic clay is deposited on the sheet as a layer of substantially uniform thickness.

3. A thin layer chromatographic apparatus as claimed in claim 1, wherein said support plate is a flexible sheet and wherein the kaolinitic clay is deposited thereon as a layer of substantially uniform thickness.

4. A thin layer chromatographic apparatus as claimed in claim 3, wherein the kaolinitic clay is admixed with a binder therefor.

5. A thin layer chromatographic apparatus as claimed in claim 4, wherein said binder is plaster of Paris and constitutes from 10 to 15 percent by weight of the mixture of kaolinitic clay and binder.

6. A thin layer chromatographic apparatus as claimed in claim 2, wherein the layer of the kaolinitic clay has a thickness in the range of from 100 to 500 microns.

7. A thin layer chromatographic apparatus as claimed in claim 3, wherein the layer of kaolinitic clay has a thickness in the range of from 100 to 500 microns.